May 26, 1959     F. D. BERGSTEIN ET AL     2,887,933

APPARATUS FOR FORMING CONTAINERS

Filed May 26, 1955     4 Sheets–Sheet 1

INVENTOR.
FRANK D. BERGSTEIN
AND LEONARD BACK,
BY Allen & Allen
ATTORNEYS.

May 26, 1959 F. D. BERGSTEIN ET AL 2,887,933
APPARATUS FOR FORMING CONTAINERS
Filed May 26, 1955 4 Sheets-Sheet 2
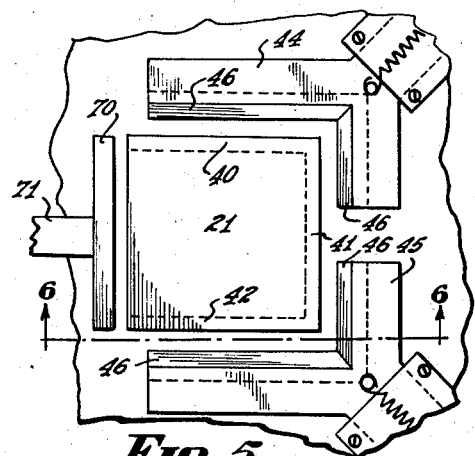
FIG.5.
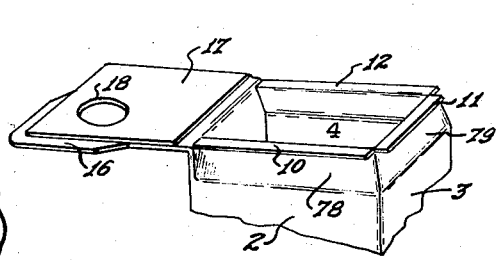
FIG.11.
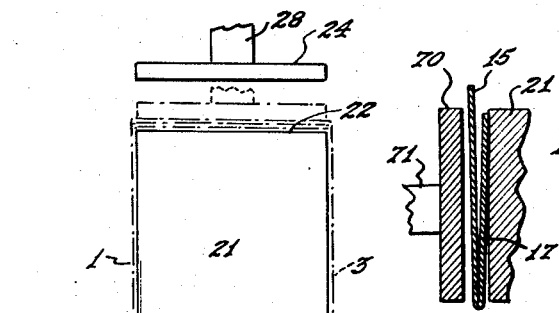
FIG.6.
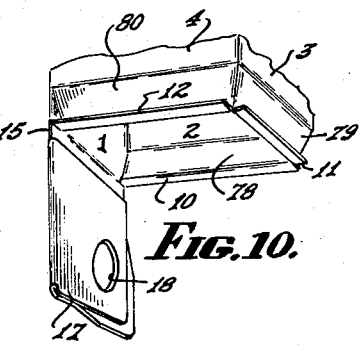
FIG.9.
FIG.10.
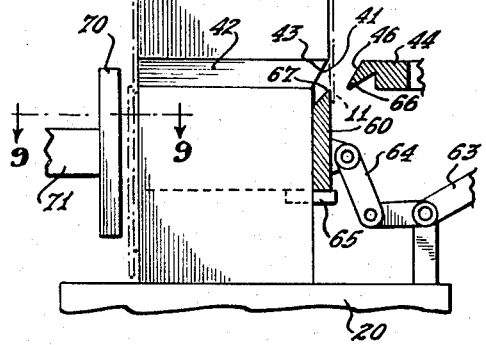
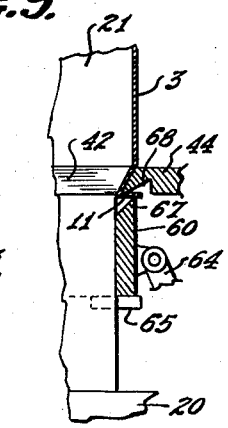
FIG.7.
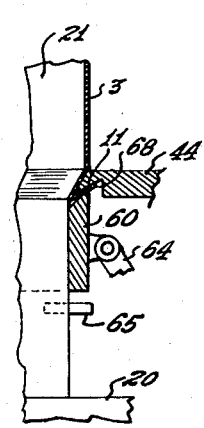
FIG.8.
INVENTOR.
FRANK D. BERGSTEIN
AND LEONARD BACK,
BY Allen & Allen
ATTORNEYS.

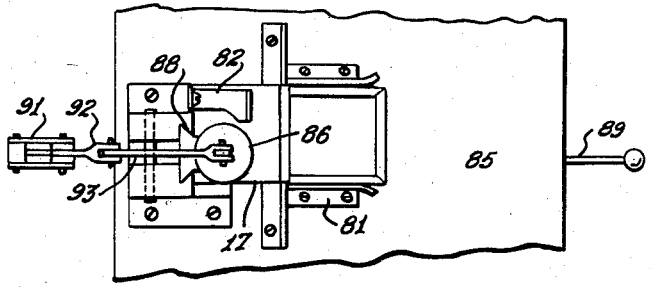
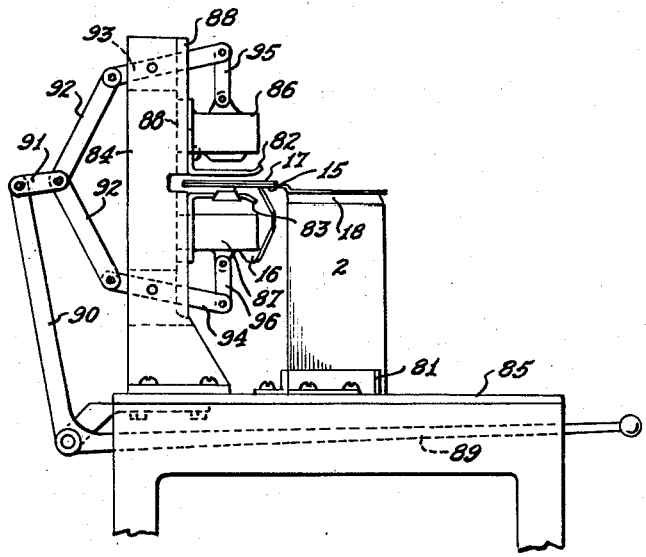
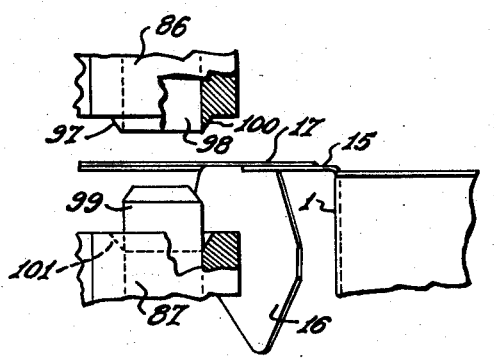

May 26, 1959  F. D. BERGSTEIN ET AL  2,887,933
APPARATUS FOR FORMING CONTAINERS
Filed May 26, 1955  4 Sheets-Sheet 4

INVENTOR.
FRANK D. BERGSTEIN
AND LEONARD BACK,
BY
Allen & Allen
ATTORNEYS.

United States Patent Office 2,887,933
Patented May 26, 1959

2,887,933

APPARATUS FOR FORMING CONTAINERS

Frank D. Bergstein and Leonard Back, Hamilton, Ohio, assignors to Bergstein Packaging Trust (a trust)

Application May 26, 1955, Serial No. 511,242

12 Claims. (Cl. 93—39.1)

This invention has to do with containers and more particularly with apparatus and procedure for folding and gluing the end closures of seal-end containers under positive sealing pressure.

In the copending application of Frank D. Bergstein, Alfred B. Kleingers, Jr., and Robert W. Nerenberg, Serial No. 476,484, filed December 20, 1954, now Patent No. 2,791,364, and entitled Dispensing Containers Having Strong End Closures and Method of Making Them, there is taught an improved seal-end container in which both ends of the structure are adapted to be adhesively secured together under positive sealing pressure. It is to the provision of apparatus and improved procedures for forming the end closures of the structures taught in the aforementioned copending application that the instant invention is directed.

A principal object of the instant invention is to provide apparatus which will effect the formation of tight end closures by means effective to support the end closures in such fashion that positive sealing pressure may be applied to the parts to seal them, the means acting to enforce the folding of the parts in predetermined fashion and support them for the application of sealing pressure.

Yet a further object of the instant invention is a procedure whereby the containers may be acted upon in a sequence of related operations susceptible to mechanization, whereby the containers may be erected and closed in a continuous and commercially practicable manner.

These and other objects of the instant invention which will appear hereinafter or which will be apparent to the skilled worker in the art upon reading these specifications, we accomplish by that apparatus and that procedure of which we shall now describe an exemplary embodiment.

Reference is now made to the figures of the drawings wherein:

Figure 5 is an enlarged fragmentary plan view of forming means adapted to act upon the top closure of the container.

Figure 6 is a vertical sectional view taken along the line 6—6 of Figure 5.

Figures 7 and 8 are partial vertical sectional views, similar to Figure 6 illustrating successive positions of the forming means.

Figure 9 is a horizontal sectional view taken along the line 9—9 of Figure 6.

Figure 10 is a partial perspective view illustrating the condition of the top closure subsequent to being acted upon by the forming means of Figures 5 and 6.

Figure 11 is a partial perspective view showing the container top in uprighted condition preparatory to being acted upon by the next succeeding machine section.

Figure 12 is a plan view of the next succeeding machine section wherein the top closure is acted upon by a die element.

Figure 13 is a side elevational view of the device of Figure 12.

Figure 14 is an enlarged fragmentary elevational view with parts in section of the die means acting upon the closure flaps.

Figure 15 is a vertical sectional view illustrating the conditions of the closure flap subsequent to the die operation.

Figure 3:
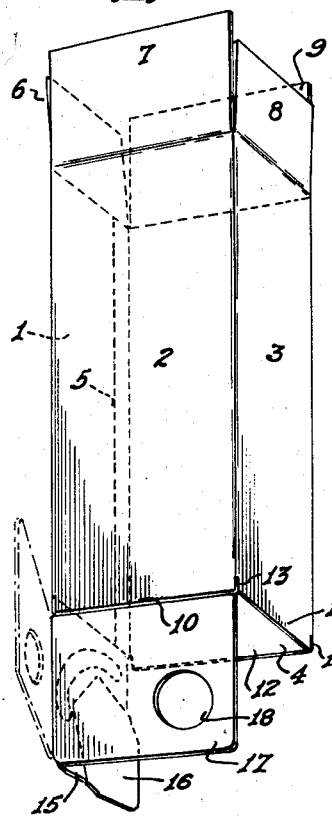
Figure 3 is a perspective view of the container adapted to be acted upon by the device of Figure 1.

The container to which the instant invention relates is illustrated in Figure 3 of the drawings and comprises tubular body walls 1, 2, 3 and 4 secured together in tubular form by means of a glue flap 5 articulated to the free side edge of body wall 4 and adapted to be adhesively secured to the free side edge of body wall 1. At its bottom end the container is provided with conventional end closure flaps 6, 7, 8 and 9. At the opposite end of the container body walls 2, 3 and 4 terminate in integral flanges 10, 11 and 12, the flanges being separated from each other by the lines of cut 13 and 14. A full width closure flap 15 is articulated to the top edge of the remaining body wall 1, the flap 15 having a liftable tab member 16 formed therein. A second full width closure flap 17 is hingedly connected to the flap 15 along a side edge thereof, the flap 17 having a pouring opening 18 formed therein adjacent a corner edge of the flap, the arrangement of parts being such that in folded condition the liftable tab member 16 will overlie and cover the pouring opening.

The container blanks will be formed in the customary manner from suitable paperboard or similar stock; and the cut and scored blanks will be tubed in the usual manner by bringing the attachment flap 5 into adhesive engagement with the body wall 1. It is contemplated that the blanks will be tubed in the manufacturer's plant and will be shipped to the user in knocked-down condition, the tubed blanks being erected and the end closures effected in the user's plant by means of the apparatus now to be described. It will be understood, that, where practicable, this apparatus may be utilized in conjunction with the blank tubing apparatus in a substantially continuous operation.

Figure 4:
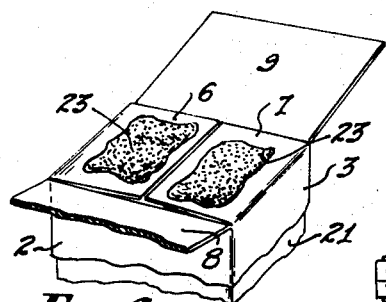
Figure 4 is a partial perspective view illustrating an intermediate step in the formation of the bottom end closure of the container of Figure 3.
Figure 2:
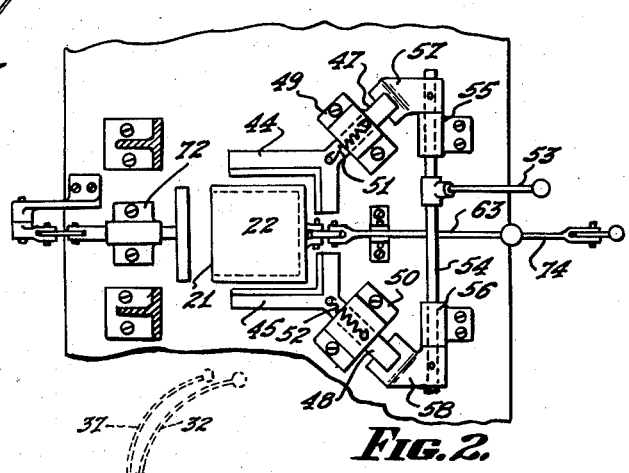
Figure 2 is a partial plan view of the device illustrated in Figure 1.
Figure 1:
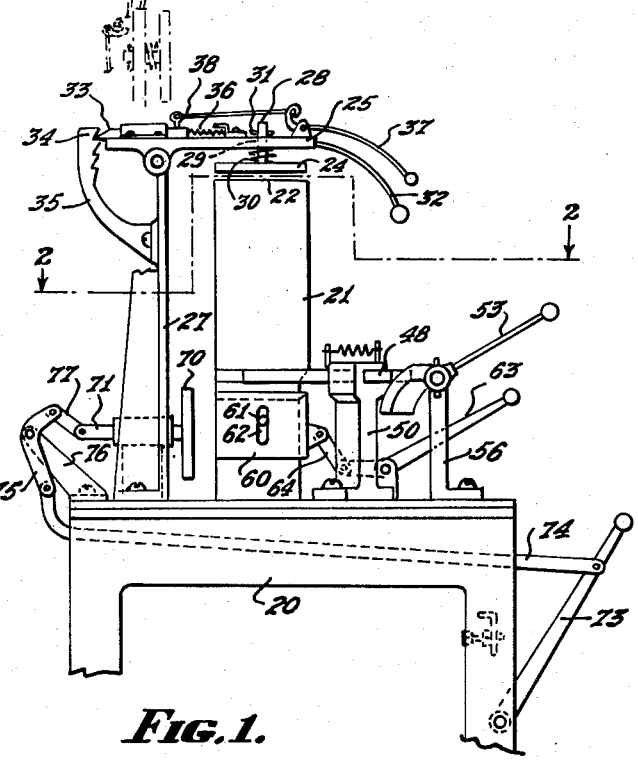
Figure 1 is a side elevational view of mechanism for acting upon the containers to close their bottom ends and at the same time acting upon the top closure to prepare it for subsequent sealing.
Figure 24:
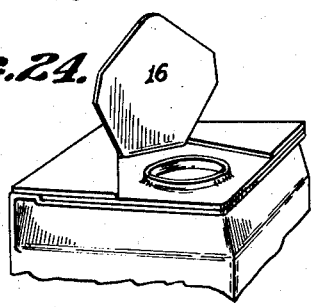
Figure 24 is a fragmentary perspective view of the completed container.

Referring now to Figures 1 and 2 of the drawings, we have therein illustrated a first machine section containing apparatus for supporting the erected container in inverted position so that the bottom end closure may be sealed across a mandrel and at the same time the top closure acted upon by forming members and flap sealing means. As seen therein, a base or support 20 carries an upstanding mandrel 21 over which the container is adapted to be fitted, the cross sectional dimensions of the mandrel corresponding substantially to the cross sectional dimensions of the container. The mandrel has a flat top 22 over which the bottom closure flaps of the container are adapted to be folded upon positioning of the container body on the mandrel with the flat surface in substantial alignment with the bottom edges of the container body walls. Preferably, the bottom closure will be formed in the manner illustrated in Figure 4, wherein opposed closure flaps 6 and 7 are first infolded with the application of adhesive 23 to their upper surfaces, whereupon the remaining closure flaps 8 and 9 may be infolded with the interposition of adhesive (not shown) therebetween. The closure flaps are then pressed into tight adhesive engagement by means of pressure plate 24 which acts to apply external pressure to the superposed flaps, the flaps being supported internally by means of the flat top 22 of the mandrel.

In the embodiment illustrated, the pressure plate 24 is mounted on an arm 25 pivoted to a shaft 26 extending between vertical supports 27 fixed on the base 20. The plate 24 has a rod 28 extending upwardly therefrom passing through an opening 29 in the arm 25. A compression spring 30 biases the plate 24 away from the arm 25, the movement of the arm being limited by the transversely disposed pin 31 passing through the rod 28. When in the closed position illustrated in solid lines in Figure 1, the arm 25 urges the plate 24 against the top of the mandrel against the compression of spring 30; and the spring 30 will be selected to supply sufficient pressure to seal the closure flaps together.

The arm 25 may be conveniently moved from the open position, which is illustrated in dotted lines in Figure 1, to the closed position by means of lever arm 32 and maintained in the closed position by means of latch pin 33 adapted to engage the notches 34 in the extension 35 supported by the vertical supports 27. The latch pin 33 is normally biased to notch engaging position by means of spring 36, but it may be withdrawn when it is desired to pivot the pressure plate to the inoperative position by depressing lever arm 37 which acts through rod 38 to move the latch pin against the tension of the spring 36.

The mandrel 21 is also provided with recessed portions 40, 41 and 42 extending across three sides thereof, the recesses having inwardly inclined faces, such as the face 43 (Figure 6) adapted to underlie body walls 2, 3 and 4 of the container adjacent their top edges. Forming members 44 and 45 having inclined faces 46 (Figure 5) are adapted to coact with the recesses 43 to deflect or crimp inwardly the upper portions of the container body walls 2, 3 and 4. As best seen in Figures 2 and 5 the forming members 44 and 45 are L-shaped, the shorter leg of each member coacting to deflect the body wall adjacent the recess 41.

The forming members 44 and 45 are mounted for container engaging movement by means of arms 47 and 48 which slide in brackets 49 and 50, the forming members being biased outwardly away from the mandrel by means of springs 51 and 52. The forming members are actuated by means of lever 53 connected to a shaft 54 journaled in supports 55 and 56. Cam members 57 and 58 are fixed to the opposite ends of the shaft, and the arrangement is such that movement of the lever will rotate the shaft and bring the cam members into contact with the outermost ends of the arms 47 and 48 causing them to move inwardly, thereby bringing the forming members into contact with the recesses.

Coacting with the forming members 44 and 45 is a U-shaped forming plate 60 which is slidably mounted on the mandrel 21 beneath the recessed portions thereof by means of pins, such as the pin 61 (Figure 1) slidably engaged in an elongated slot 62. Vertical movement is imparted to the U-shaped plate by means of lever 63 which acts through link 64 to move the plate up and down. The lowermost position of the plate is illustrated in Figures 6 and 7, a stop 65 being provided against which the plate is adapted to seat.

When in its lowermost position the upper edges of the plate will coincide with the bottom edges of the inclined faces of the recessed portions 40, 41 and 42 of the mandrel, which edges coincide with the top edges of the body walls 2, 3 and 4 of a container positioned over the mandrel. Only the flanges 10, 11 and 12 extend downwardly beyond the upper edges of the plate 60, as in the manner illustrated in broken lines in Figure 6. The arrangement is such that when the forming members 44 and 45 are moved inwardly their lowermost or leading edges, indicated at 66 in Figure 6, will coact with the uppermost edges 67 of the plate 60 to cause the flanges 10, 11 and 12 to be bent outwardly in the manner best seen in Figure 7. Thereafter, the plate 60 is moved upwardly by depressing the lever 63, and the uppermost edges 67 of the plate are caused to enter into mating grooves 68 in the under surfaces of the forming members 44 and 45. During its upward movement the plate 61 contacts and bends upwardly the outwardly bent flanges 10, 11 and 12, causing the flanges to assume the reversely bent position illustrated in Figure 8. We have found that this reverse folding of the flanges is highly desirable since, without it, the normal resiliency of the board is such that the flanges tend to to return to their original unfolded position upon withdrawal of the forming members. Where the flanges are reversely folded to substantially the degree illustrated in Figure 8, we have found that the flanges, upon being released, will assume a position substantially horizontal with respect to the container body walls, which is the desired position for subsequent sealing operations.

A vertically disposed pressure plate 70 lies to the rear of the mandrel 21, being supported by a rod 71 journaled in a bracket 72 mounted on the support 20. The plate 70 is adapted to coact with the rear face of the mandrel to compress the full width flaps 15 and 17 therebetween, in the manner best seen in Figure 9 of the drawings. It will be understood that the closure flap 17 will be juxtaposed to the flap 15 with the interposition of adhesive therebetween, care being taken to omit adhesive in the area of the liftable tab member 16. Thus positive sealing pressure is applied to adhesively secure the full width flaps together.

The pressure plate 70 is actuated by means of lever 73 which acts through rod 74 to actuate a link 75 pivoted intermediate its ends to a support 76 secured to the frame 20. At its opposite end the link 75 is connected to the end of the rod 71 by means of a second link 77.

It will be apparent from the foregoing that the pressure sealing of the bottom closure, the inward deflecting of the upper portions of the body walls together with the outfolding of the flanges and the sealing together of the full width closure flaps may be conducted substantially simultaneously or in rapid succession. Upon being acted upon by the means just described the top of the container will assume the condition illustrated in Figure 10, wherein it will be seen that the top portions of the body walls 2, 3, and 4 are deflected inwardly, as at 78, 79 and 80, with the flanges 10, 11 and 12 extending outwardly therefrom. Full width flap 17 is juxtaposed and adhesively secured to full width flap 15. While some outward deflection of the inwardly deflected portions 78, 79 and 80 occurs as the container is withdrawn from the mandrel 21, it is of a relatively minor nature and the carton top will assume substantially the position illustrated in Figure 11 upon being removed from the mandrel.

Upon being removed from the mandrel and uprighted, the container is then moved to the device illustrated in Figures 12, 13 and 14 wherein the flap member 17 is acted upon by die elements serving to flare the flap outwardly about the periphery of the pouring opening 18. The purpose of this operation is to effectively increase the thickness of the pouring opening beyond the thickness of the board layer in which it is formed, the flared opening providing, in effect, a well into which sealing substance may be poured to define a plug secured to the liftable tab member 16 which overlies the pouring opening. Reference is made to the copending application of Frank D. Bergstein, Serial No. 415,030, filed March 9, 1954, now abandoned, and entitled Reclosable Pouring Opening For Containers, in which this type of pouring opening is disclosed.

As shown in the dawings, the carton may be positioned in a jig 81 with the the juxtaposed full width closure flaps 15 and 17 extending rearwardly between the guide plates 82 and 83 which extend outwardly from the die support 84. This support as well as the jig 81 may be conveniently mounted on a supporting surface 85 which may take the form of a bench or table. Vertically movable die elements 86 and 87 are slidably mounted in channels, indicated at 88, in the die support. Relative movement of the die element is effected by means of the lever arm 89 which acts through extension 90 and link 91 to actuate the bell crank 92 which in turn pivots arms 93 and 94 connected to the die elements by means of connecting links 95 and 96.

As best seen in Figure 14, the die element 86 is provided with a depending annular flange 97 and a vertical bore 98 of a size to receive the plug-like portion 99 of the die element 87. The plug-like portion 99 will be of a size substantially equal to the size of the pouring opening 18 in the closure flap 17. The inclined face 100 of the annular flange 97 will thus contact portions of the flap 17 surrounding and immediately adjacent to the pouring opening and, as the die elements come together, the flange 97 will flare the flap downwardly into the annular channel 101 in the die element 87. The result of this operation is to flare the flap 17 about the periphery of the opening 18 to define the flange or rim 102, as illustrated in Figure 15. It will be noted that during the flaring operation, the underlying liftable tab member 16 will be deflected to one side of the die element in the manner shown in Figure 14.

Figure 17:
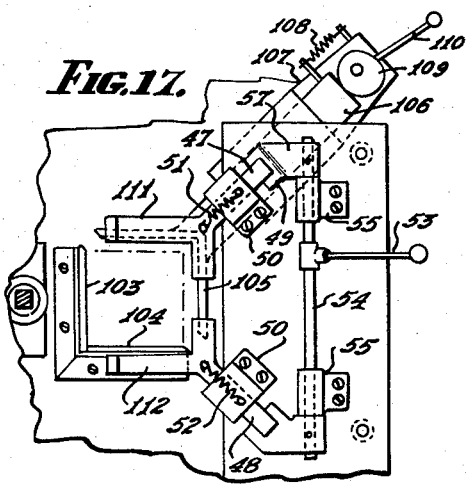
Figure 17 is a horizontal sectional view taken along the line 17—17 of Figure 16.
Figure 18:
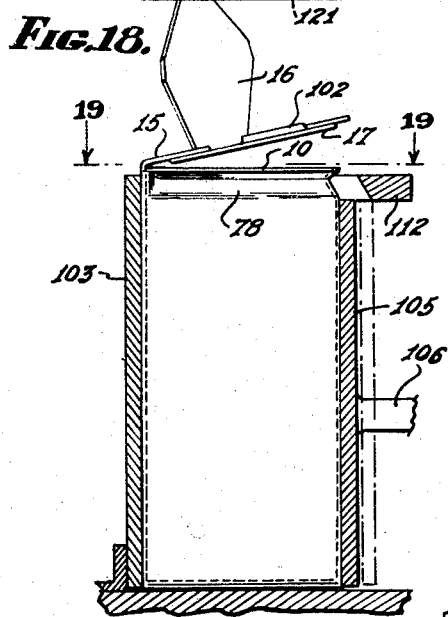
Figure 18 is an enlarged fragmentary vertical section illustrating the manner in which the top closure is effected, the view being taken along line 18—18 of Figure 19.
Figure 16:
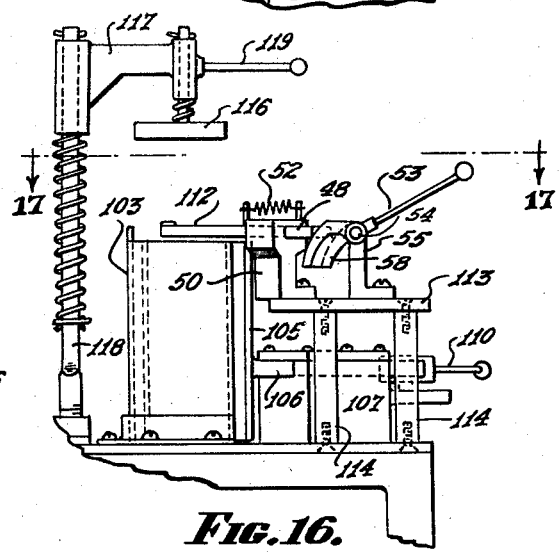
Figure 16 is a side elevational view of the final section of the machine wherein the top closure is sealed under positive pressure.

After being acted upon by the die elements 86 and 87, the container in upright condition is transferred to the device illustrated in Figures 16 and 17 wherein external forming members act to align and support the outturned flanges 10, 11 and 12 for juxtaposition of the full width closure flaps thereto and the subsequent application of pressure to seal the closure flaps to the flanges. During this operation the container is held in an aligning jig having stationary side walls 103 and 104 disposed at right angles to each other. The container is placed in the jig with body wall 1 against the side wall 103 and body 2 against side wall 104 in of the jig, whereupon the remaining side walls of the jig, in the form of a right angle plate 105, are moved inwardly into container contacting position. The angle plate 105 is movably mounted by means of a rearwardly extending plate 106 which slides in a support 107. The plate 107 is normally biased rearwardly by means of a spring 108; and it is moved forwardly so as to bring the angle plate into contact with the container by means of the eccentric cam member 109 which is moved by means of lever 110. In operation this portion of the device serves to "square-up" the container body so that the body walls extend at right angles to each other. This will assure that the parts are in proper alignment when the seal is effected between the top closure flaps and the flanges carried by the body walls.

After the carton body walls have been properly aligned by the jig, the walls are acted upon by the L-shaped forming members 111 and 112 which coact in much the same manner as the forming members 44 and 45 described hereinbefore, the forming members in this instance serving to press inwardly the initially deflected wall portions 78, 79 and 80 to bring the flanges carried thereby into proper alignment for contact by the full width closure flaps. The forming members are also adapted to underlie the outurned flanges 10, 11 and 12 which they support during the subsequent pressure sealing of the full width flap. Movement of the forming members 111 and 112 may be controlled by means substantially identical with the means illustrated in Figures 1 and 2 of the drawings; and for purposes of simplicity the like parts have been given identical reference numerals. It is desirable, however, to elevate the actuating means above the control for the movable angle plate, and to this end the supports 55 and 56 may be mounted on an elevated platform 113 which is supported by shafts 114.

We have found that when the deflected wall portions 78, 79 and 80 and the flanges 10, 11 and 12 have been preformed by means of the forming members 44 and 45, and the forming plate 60, and thereafter acted upon by the L-shaped forming members 111 and 112 a substantially perfect alignment of the parts takes place. The flanges 10, 11 and 12 lie at right angles to the main body walls and also mate laterally with each other at their end edges so as to give the appearance of one continuous flange extending around the three walls of the container.

Figure 19:
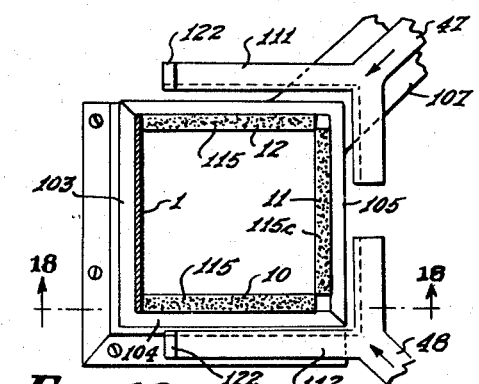
Figure 19 is a horizontal sectional view taken along the line 19—19 of Figure 18.

Upon movement of the forming members 111 and 112 to container engaging position, the full width closure flaps 15 and 17 are infolded so as to bring marginal edge portions of the flap 17 into contacting relation with the flanges. It will be understood that prior to the infolding of the closure flaps adhesive will have been applied either to the flanges or to the marginal edges of the flap 17. Such adhesive is indicated at 115 in Figure 19 of the drawings.

Figures 20, 22, 23:
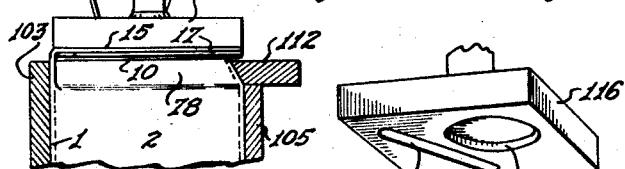
Figure 20 is a partial vertical sectional view similar to Figure 18 but illustrating the pressure applying means in closed position.
Figure 22 is a partial perspective view of the pressure applying means for the top closure.
Figure 23 is an enlarged fragmentary perspective view of the top closure forming and supporting members.

Sealing pressure is applied to the top closure by means of pressure plate 116 which may be conveniently carried on an arm 117 slidably mounted on a vertical shaft 118, movement of the pressure plate being controlled by means of lever 119. As best seen in Figure 22 the pressure plate has an elongated slot 120 extending therethrough through which the liftable tab member 16 is inserted; and it also has a dished or recessed portion 121 on its undersurface of a size to surround the flange or rim 102 so as to prevent the flange from being crushed during the application of sealing pressure to the top closure. Figure 20 illustrates the parts in sealing position and it will be evident from the figure that the forming members 111 underlie and support the out-turned flanges during sealing, the closure flaps and flanges in effect being compressed between the forming members and the pressure plate. The forming members 111 and 112 are in turn supported by the upper edges of the angle plate 105 and the stationary side wall 104. This results in a strong support for the pressure applied from above by the pressure plate 116.

Figure 21:
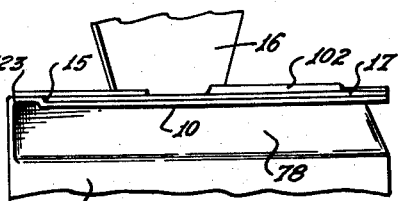
Figure 21 is an enlarged fragmentary elevational view of the top closure subsequent to being acted upon by the device of Figure 16.

While the closure flap 17 is essentially a full width flap, it is narrower than the flap 15 in one direction by the width of the flange 10, as will be evident from an inspection of Figure 3. Consequently, when the closure flaps 15 and 17 are juxtaposed there will be a marginal area adjacent the line of fold connecting the flap 15 to body wall 1 which is composed of a single thickness of board rather than of two thicknesses of board, as is the remainder of the top. To assure a positive seal between the closure flaps and the flanges in this marginal area, we have found it desirable to provide the forming members 111 and 112 with ledges 122, as best seen in Figure 23, which, when the parts are sealed together, compress the end portions of the flanges 10 and 12 in the manner indicated at 123 in Figure 21, whereby assuring a positive seal in the marginal area immediately adjacent the top edge of the body wall 1.

It will be understood that when sealed the container may be used as is, although we prefer to thereafter provide interior end castings in accordance with the teachings of Bergstein Patent 2,549,048, dated April 17, 1951, and entitled Liquid-Tight Carton and Method. In accordance with the teachings of this patent the container ends are sealed by interior end flooding, thereby providing relatively thick castings of sealing substance which bond to the ends of the container body walls to provide imperforate end closures. At the top end of the container the sealing substance enters the well defined by the flange 102 and adheres to the exposed portion of the liftable tab member 16. When the tab member is lifted it will cause the casting to fracture along a line determined by the periphery of the flanged opening, so that a plug-like element of the casting comes away with the lifted tab, thereby providing a plug which may be reinserted in the pouring opening.

Modifications may, of course, be made in our invention without departing from the spirit of it. For example, while the apparatus illustrated is hand actuated, it will be readily apparent to the skilled worker in the art that the mechanical motions involved may be readily mechanized and timed for synchronized automatic movement. Similarly, it is contemplated that the apparatus may be utilized in conjunction with suitable conveying mechanisms for transporting the containers from station to station. It is also contemplated that the container blanks may be tubed about the mandrel 21 rather than fitted on the mandrel in tubular form. To this end it will be noted that the glue flap 5 of the container overlies the body wall 1 and, when wrapped about the mandrel, would contact the rear or flat wall of the mandrel, thereby permitting ready sealing of the side seam of the container against the rear wall of the mandrel.

Having, however, described our invention in an exemplary embodiment, what we desire to secure and protect by Letters Patent is:

1. In a device for forming and sealing containers, a mandrel over which a container body is fitted, recesses extending across adjacent faces of said mandrel, mating forming members movable into and out of engagement with said recesses, additional forming means slidably mounted beneath said recesses for movement axially of said mandrel, and a pressure plate overlying the top of said mandrel for pressing together closure flaps folded and juxtaposed across the top of said mandrel.

2. In a device for forming and sealing containers, a mandrel over which a container body is fitted, recesses extending across a plurality of adjacent faces of said mandrel, mating forming members movable into and out of engagement with said recesses, additional forming means slidably mounted beneath the recesses in said mandrel for movement axially thereof, a pressure plate overlying the top of said mandrel, and a second pressure plate for contact with a face of said mandrel in an area beneath the recesses therein, whereby additional flaps carried by said container body may be juxtaposed and pressed together between said last named pressure plate and a face of said mandrel.

3. In a device for forming and sealing containers, a mandrel over which a container body is fitted, pressure applying means overlying the top of said mandrel for sealing together closure flaps connected to the uppermost end of the container body, recesses extending across three adjacent faces of said mandrel adjacent the lowermost end of the container body, forming members movable into and out of engagement with said recesses for deflecting inwardly areas of the container body adjacent the lowermost end thereof, additional forming means movable axially of said mandrel and coacting with said first named forming means to fold outwardly flanges connected to the lowermost end of said container body, and a second pressure plate movable into and out of engagement with said mandrel in an area beneath the recesses therein, said last named pressure plate being adapted to press together juxtaposed closure flaps connected to the lowermost end of the container body.

4. The device claimed in claim 3 wherein said additional forming means is adapted to be moved upwardly when said forming members are in engagement with said recesses, said forming members having grooves in the under surfaces thereof for receiving the upper edges of said additional forming means, whereby the flanges on the lowermost end of the container body may be reversibly folded with respect to the walls of the container body.

5. In a device for forming and sealing containers, a mandrel over which a container body is fitted, recesses extending across adjacent faces of said mandrel adjacent the lowermost end of the container body, forming means movable into and out of engagement with said recesses for deflecting inwardly areas of the container body adjacent the lowermost end thereof, additional forming means mounted beneath said recesses and movable upwardly for coaction with said first named forming means to fold outwardly flanges connected to the lowermost end of the container body, said additional forming means having leading edge portions adapted to enter into mating grooves in the under surfaces of said first named forming means, whereby to fold the flanges through an angle greater than 90°.

6. In a device for forming and sealing containers, a mandrel over which a container body is fitted, recesses extending across adjacent faces of said mandrel adjacent the lowermost end of the container body, forming means movable into and out of engagement with said recesses for deflecting inwardly areas of the container body adjacent the lowermost end thereof, said mandrel in the areas beneath said recesses being cut away to provide vertically disposed wall portions offset inwardly with respect to the face portions of the mandrel extending above the recesses, additional forming means mounted beneath said recesses for vertical sliding movement along the inwardly offset wall portions of the mandrel, said additional forming means coacting with said first named forming means to fold outwardly flanges connected to the lowermost end of the container body, said additional forming means comprising plates the outer surfaces of which are inalignment with the face portions of the mandrel lying above said recesses, said plates being movable from a lowermost position to an uppermost position and arranged, when in the lowermost position, to contact the inner surfaces of said flanges.

7. The device claimed in claim 6 wherein said first named forming means has leading edges adapted to contact the container along lines defining the base edges of the flanges, wherein said plates have leading edges lying in substantially vertical alignment with the face portions of said mandrel, and wherein said first named forming means have grooves in the under surfaces thereof for receiving the leading edges of said plates.

8. In a device for forming containers, a rectangular mandrel having vertically disposed walls, at least three of said walls terminating at their lower ends in inwardly and downwardly inclining shoulders, horizontally disposed forming members movable into and out of engagement with said shoulders, said forming members having inclined faces mating with the inclined shoulders of said mandrel, coacting forming members mounted beneath said shoulders and movable vertically into and out of engagement with said first named forming members, said first named forming members having notches in the under-surfaces thereof for engagement by said coacting forming members, means for first actuating said horizontally disposed forming members to move them into engagement with said shoulders, and means for thereafter actuating said coacting forming members to move them upwardly into engagement with the notches in said first named forming members.

9. The device claimed in claim 8, wherein the upper end of said mandrel is arranged to have end closure flaps folded and juxtaposed thereacross, and pressure applying means overlying the upper end of the mandrel for pressing together the folded and juxtaposed closure flaps to provide a pressure seal therefor.

10. The device claimed in claim 8, wherein the remaining wall of said mandrel has a wall surface extending below the shoulders in the other walls of the mandrel, and a pressure applying member arranged to coact with said last named wall surface, whereby additional flaps carried by a container body may be juxtaposed and sealed together under positive pressure between said last named pressure applying means and the said wall surface.

11. In a device for forming and sealing containers, a mandrel over which a container body is fitted, recesses extending across adjacent faces of the mandrel, mating forming members movable into and out of engagement with said recesses, and a pressure plate overlying the top of said mandrel for pressing together closure flaps folded and juxtaposed across the top of said mandrel.

12. In a device for forming and sealing containers, a mandrel over which a container body is fitted, recesses extending across adjacent faces of the mandrel, mating forming members movable into and out of engagement with said recesses, a pressure plate overlying the top of said mandrel for pressing together closure flaps folded and juxtaposed across the top of said mandrel, and a second pressure plate for contact with a face of said mandrel in an area beneath the recesses therein, whereby additional flaps carried by said container body may be juxtaposed and pressed together between said last named pressure plate and a face of said mandrel.

References Cited in the file of this patent
UNITED STATES PATENTS

| | | |
|---|---|---|
| 1,257,949 | Adelson | Feb. 26, 1918 |
| 1,346,827 | Jennings | July 20, 1920 |
| 1,933,180 | Meyer-Jagenberg | Oct. 31, 1933 |
| 2,018,621 | Becker | Oct. 22, 1935 |
| 2,201,177 | Hothersall | May 21, 1940 |
| 2,363,425 | Klein | Nov. 21, 1944 |
| 2,585,031 | Odquist et al. | Feb. 12, 1952 |